Patented Oct. 21, 1952

2,615,043

UNITED STATES PATENT OFFICE 2,615,043

METHOD OF PREPARING ETHYL DICHLOROPHOSPHINE

Morris S. Kharasch, Chicago, Ill., and Sidney Weinhouse, Chester, Pa., assignors to the United States of America as represented by the Secretary of War No Drawing. Application February 21, 1944, Serial No. 523,364

1 Claim. (Cl. 260—543)

The invention described herein may be manufactured and used by or for the Government for governmental purposes without the payment to us of any royalty thereon.

This invention relates to a method for the preparation of ethyldichloroarsine and related organo-mineral-halides.

An object of this invention is to provide a method for securing high yields of the desired product and which is well suited for industrial scale manufacture.

Ethyldichloroarsine was introduced as a chemical warfare agent by the Germans in 1918. The best known methods for preparing this compound have been essentially the same as the German process. They are complicated and involve the following steps: (1) the conversion of ethyl chloride into disodium ethyl arsenate; (2) the reduction of disodium ethyl arsenate with sulfur dioxide to form ethyl arsenious oxide; (3) the treatment of ethyl arsenious oxide with hydrogen chloride to form ethyldichloroarsine. It has been confirmed that this process gives an average over-all yield of only about 27 to 36% at the most.

It is evident that such prior methods are ill suited for large scale operation. For this reason a new and radically different method has been developed.

In the new method of this invention, ethyldichloroarsine is prepared by a reaction of arsenic trichloride with tetraethyl lead under suitable conditions.

Theoretically, the over-all reaction is:

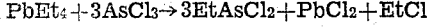

However, it is important to note that the reaction evidently takes place in two stages.

The first stage of the reaction is represented by the equation:

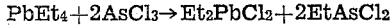

and proceeds spontaneously at room temperature or at temperatures below 50° C. At these temperatures even an excess of arsenic trichloride fails to detach a third ethyl radical from the lead atom.

The second stage represented by:

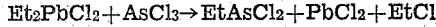

proceeds slowly at 80° C. and rapidly at temperatures above 90° C.

The reactions may be carried out in the presence of suitable solvents, and the over-all reaction may be carried out in the absence of solvents. When low-boiling solvents are used, only the first stage occurs; but when the reaction is carried out above 80° C., either in the presence or absence of a high-boiling solvent, e. g. nitrobenzene, both stages proceed simultaneously. The ethyl chloride formed in the second stage may be recovered quantitatively by chilling the evolved gases. Pure ethyldichloroarsine may be obtained by distilling through an efficient column the product obtained in the reaction described. The density of the distillate is 1.6570 for $$D_{20}^{22}$$

It boils at 82.5° C. under 75 mm. pressure.

As a specific example, the following directions convenient for the preparation of ethyldichloroarsine in batches of about 5 lbs. are given. The reaction is carried out at above 90° C. and in the absence of any solvent. Both stages of the reaction proceed simultaneously.

EXAMPLE 1

In a 5-liter, 3-neck flask equipped with a dropping funnel having a gas inlet side arm, an efficient mechanical stirrer and a reflux condenser is placed 2,730 g. (15 moles) of arsenic trichloride. Air is swept out of the flask by passing dry nitrogen through a flexible tube leading to the glass inlet tube attached to the dropping funnel. The flexible tube is then closed off with a screw clamp. The flask is placed in an oil bath heated to 100° C.; and after the arsenic trichloride has reached approximately that temperature, a few cc. of tetraethyl lead is added from the dropping funnel to the stirred arsenic trichloride. The start of the reaction, which occurs in a few minutes, is indicated by clouding of the liquid and separation of a white precipitate. A total of 1,620 g. (5 moles) of tetraethyl lead is then added through the dropping funnel at such a rate that the reaction mixture is kept gently boiling. During this addition of the tetraethyl lead and for one hour after the addition is complete, stirring is continued, and the oil bath is held at a temperature of about 100–110° C. About seven hours in all is required for these operations.

After the product has cooled to about room temperature, the flask is connected with a Claisen still-head. The product is distilled directly from the reaction mixture at 75 mm. pressure. The receiver, a 3-liter, round-bottom flask, is connected to a vacuum pump through a trap kept at −80° C. During the distillation the oil bath is maintained at 120° C.; the product distills at 82–83° C. About 80% of the product distills over in four to five hours; the distillation of the remainder is slower because of the large amount of lead chloride in the flask. The process may be hastened by gradually reducing the pressure. About ten hours is required to distill over an amount equivalent to a 95% yield.

The density of the crude water-white product varied in four runs from 1.6735 to 1.6799 as compared to 1.6570 for the very pure material distilled through a column. Hence the distillate obtained as described is 95.5 to 97% pure. The impurity is arsenic trichloride, the boiling point of which is 20% below that of ethyldichloroarsine. Fractionation through a column readily separates the two substances, and the arsenic trichloride may be recovered. The percentages thus obtained check well with the composition calculated from the density of the crude material.

The described method with slight modifications which are apparent can be applied on a commercial scale. On an industrial scale the crude reaction product may be separated from the precipitated lead chloride by filtration. This type of separation has been successfully carried out. No difficulties were experienced in carrying out the method described with proper precautions in handling the materials and in removing fumes.

For the purpose of comparison, arsenic trichloride was treated with tetraethyl lead in a manner similar to that described except in using carbon tetrachloride as a solvent in the reaction mixture and treating the mixture for about twelve hours at approximately the boiling point of the solvent. The yield of ethyldichloroarsine by this low-temperature preparation was only 69% if the first stage reaction is used as a basis of calculation, and is only 46% if the over-all reaction is used. Similar results were obtained when benzene (boiling point of 78° C.) or ligroin were used as solvents and the reaction carried out at temperatures below 80° C.

In another investigation the proportion of arsenic trichloride to tetraethyl lead was increased to four moles to one. Benzene was used as a solvent, and the reaction was carried out at below 80° C. The recovered arsenic trichloride amounted to 1.3 mole equivalent; the ethyldichloroarsine obtained was equivalent to two moles of arsenic trichloride. These results show that at a temperature below 80° C., a large excess of arsenic trichloride was capable of removing only two ethyl groups from the tetraethyl lead.

In all reactions conducted at temperatures above 80° C., with or without solvent, where three moles of arsenic trichloride to one mole of tetraethyl lead were used, the yield of ethyldichloroarsine approached the theoretical. For example, in a preparation in which no solvent was employed, the yield was 96.5%.

The liquid collected by condensing gas evolved during the reaction had a molecular weight corresponding to that of ethyl chloride and boiled at 12° C. The solid residue was almost pure lead chloride.

Anal. Calcd. for $PbCl_2$: Cl, 25.5. Found: Cl, 25.8.

When an equimolecular mixture of diethyllead dichloride and arsenic trichloride was heated to 125° C., there was a vigorous reaction and ethyl chloride was evolved. The reaction mixture was distilled at 75 mm. The product obtained was ethyldichloroarsine in a yield of 75%.

Reactions similar to the one used in the preparation of ethyldichloroarsine may be used for the preparation of a number of related organo-mineral-halides, in general, represented by the formula $$R_n\text{---}M\text{---}X_m$$

wherein $R_n$ represents organic radicals, such as alkyl, aryl, alkaryl or aralkyl radicals; M represents a metal, non-metal or semi-metal, such as arsenic, phosphorus or antimony; and $X_m$ stands for halogen groups, generally chloride or bromide groups; the subscripts $n$ and $m$ being whole numbers which add up to the valence of the constituent M, which is three for the trivalent mineral atom.

Preparations here described are those of (1) diethylchloroarsine $(C_2H_5)_2AsCl$; (2) ethyldichlorophosphine $C_2H_5PCl_2$ and (3) ethyldichlorostibine $C_2H_5SbCl_2$.

EXAMPLE 2

*Diethylchloroarsine preparation.*—At high temperatures, excess tetraethyl lead reacts with ethyldichloroarsine to form diethylchloroarsine. Ethyldichloroarsine, 52.5 g. (0.3 mole) was heated to 120° C., and 48.5 g. (0.15 mole) of tetraethyl lead was slowly added. The separation of a white precipitate indicated that reaction had occurred. After the mixture had been kept at 120° C. for two hours, the product was distilled directly from the reaction flask. A yield of 39.3 g. of diethylchloroarsine was obtained. This product boiled at 74–78° C. under 74 mm. pressure.

$D_{20}^{20}$, 1.215

Anal. Calcd. for $Et_2AsCl$: Cl, 21.1. Found: Cl, 18.0.

The product is, therefore, mainly diethylchloroarsine with a small amount of triethylarsine.

The white residue from the reaction was washed with benzene; it weighed 49 g. The theoretical yield was 50.5%.

Anal. Calcd. for $(C_2H_5)_2PbCl_2$: Cl, 21.2. Found: Cl, 21.9.

EXAMPLE 3

*Ethyldichlorophosphine preparation.*—Phosphorus trichloride, 69 g. (0.5 mole) was placed in a three-necked flask fitted with a dropping funnel, mechanical stirrer and a reflux condenser. While a slow stream of nitrogen was passed into the flask, 54 g. (0.167 mole) of tetraethyl lead was added. Reaction was extremely slow; there was no precipitation of lead until the mixture had been refluxed for two hours. The flask was heated in an oil bath at 110° C. until the mixture ceased to reflux (36 hours). The volatile material was then distilled directly from the reaction vessel. The 58.5 g. of colorless, evil-smelling distillate (B. P. 94–97° C. at 760 mm.) represents a yield of 89 per cent.

Anal. Calcd. for $C_2H_5PCl_2$: Cl, 54.2. Found: Cl, 56.2, 56.1.

EXAMPLE 4

*Ethyldichlorostibine preparation.*—In the apparatus for preparing ethyldichloroarsine, 68.4 g. (0.3 mole) of dried and pulverized antimony trichloride was suspended in 160 cc. of solvent. Tetraethyl lead (32.3 g., 0.1 mole) was then added slowly. The mixture was heated under reflux for eight hours and then cooled. After the solvent had been removed by distillation, the residue was distilled under reduced pressure. The product which boiled between 113° and 120° C. at 25 mm. was redistilled. A total of 48.6 g. of a colorless liquid was obtained (B. P. 62–83° C. at 1 mm., D 2.182).

Anal. Calcd. for $EtSbCl_2$: Cl, 31.95. Found: 31.40.

In these preparations a halide of a trivalent mineral constituent is treated with an organo-lead compound under conditions that are properly controlled to bring about replacement of the desired number of halogen constituents in the halide by organic radicals. To obtain proper control of the reactions, it is advantageous to heat the halide under reflux and to control the rate of reaction by the rate of addition of the organo-lead compound. The control is important for allowing the reaction to be brought up to the proper high temperature level. It has been shown that desired products are not obtained in satisfactory yields unless the reaction is carried out at a proper temperature level.

At a sufficiently high reaction temperature level, which may vary with the reactants and is in a number of instances of the order of 90° C. and higher, the organo-lead compound, represented by $PbR_4$ or $R_2PbX_2$, R being a hydrocarbon radical and X a halide radical, tends to be reduced to $PbX_2$, the dihalide. Thus, likewise, at a sufficiently elevated reaction temperature, a $PbR_4$ compound, such as tetraethyl lead, is made to lose more than 2 R (hydrocarbon) radicals from a molecule.

The organo-mineral-halides, and particularly the organo-mineral-dihalides in which the mineral constituent is trivalent, have important uses as chemical warfare agents. In some instances the organo groups may be methyl or phenyl radicals for greater effectiveness. In the event the organo-metal halides lack the desired viscosity or persistency, they may be used together with suitable thickening agents. For example, ethyldichloroarsine may be blended with cellulose acetatebutyrate. A 5% solution of this type is comparable in consistency to glycerine and is quite stable. In addition to increasing the viscosity of the agent, a thickening additive may aid in lowering the volatility. The organo-mineral-halides may also be used in mixtures with other toxic agents.

It is to be understood that modifications may be made which come within the spirit and scope of the invention.

We claim:

A method of preparing ethyldichlorophosphine which comprises reacting phosphorus trichloride with tetraethyl lead at a temperature above 90° C.

MORRIS S. KHARASCH.
SIDNEY WEINHOUSE.

REFERENCES CITED

The following references are of record in the file of this patent:

Raiziss et al.: "Organic Arsenical Compounds," pp. 42 and 43 (1923).

Textbook of Inorganic Chemistry, by Friend, vol. XI, part III (1936), pp. 31, 32, 210 and 211.

Gilman et al.: Jour. Organic Chem., vol. 4 (1939), pp. 162 to 168.

Cengio Giom: Chim. Ind. I, 68–75 (1919).

Matsumiya: "Mem. Col. Sci. Kyoto Imp. Univ.," vol. 8, pp. 391 to 396 (1925).